United States Patent
Hu et al.

(10) Patent No.: US 9,926,137 B2
(45) Date of Patent: Mar. 27, 2018

(54) FORK ASSEMBLY FOR STORAGE/RETRIEVAL MACHINE AND STORAGE/RETRIEVAL MACHINE, METHOD FOR CONVEYING CARTRIDGES

(71) Applicants: BOE TECHNOLOGY GROUP CO., LTD., Beijing (CN); BEIJING BOE DISPLAY TECHNOLOGY CO., LTD., Beijing (CN)

(72) Inventors: Xiaohui Hu, Beijing (CN); Jianyong Chen, Beijing (CN); Haitao Zhang, Beijing (CN); Sung Hwan Yoon, Beijing (CN); Hong Wang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 465 days.

(21) Appl. No.: 14/373,922

(22) PCT Filed: Oct. 22, 2013

(86) PCT No.: PCT/CN2013/085704
§ 371 (c)(1),
(2) Date: Jul. 23, 2014

(87) PCT Pub. No.: WO2015/003437
PCT Pub. Date: Jan. 15, 2015

(65) Prior Publication Data
US 2016/0272424 A1   Sep. 22, 2016

(30) Foreign Application Priority Data
Jul. 9, 2013 (CN) .......................... 2013 1 0285853

(51) Int. Cl.
*B65G 1/04* (2006.01)
*B65G 1/137* (2006.01)
(Continued)

(52) U.S. Cl.
CPC ............. *B65G 1/137* (2013.01); *B65G 1/04* (2013.01); *B65G 49/06* (2013.01); *B65G 49/067* (2013.01);
(Continued)

(58) Field of Classification Search
CPC ............................ B65G 1/04; H01L 21/67748
(Continued)

(56) References Cited

U.S. PATENT DOCUMENTS

2007/0140817 A1* 6/2007 Hansl .................... B66F 9/063
                                                       414/277
2007/0269297 A1* 11/2007 Meulen ................. B65G 25/02
                                                       414/222.01
(Continued)

FOREIGN PATENT DOCUMENTS

CN    102020090 A    4/2011
CN    103318812 A    9/2013

OTHER PUBLICATIONS

PCT Written Opinion (Chinese language), for PCT/CN2013/085704; 5 pgs.
(Continued)

*Primary Examiner* — Jonathan Snelting

(57) ABSTRACT

A fork assembly (4) for storage/retrieval machine of high convey efficiency comprises: a rotating table (41); an extension arm (43) provided on the rotating table (41) and capable of conducting stretching motion; a driver unit (42) configured for driving the extension arm (43) to conduct the stretching motion; a control system (100) configured for controlling an operation of the driver unit (42); a position
(Continued)

sensor (46) for the breakpoint which is connected to the control system (100) and configured for determining whether the extension arm (43) performs the stretching motion up to the breakpoint (9), and the breakpoint (9) is located between a maximum distance point (10) and a minimum distance point (8) to which the extension arm (43) extends.

11 Claims, 3 Drawing Sheets

(51) Int. Cl.
*B66F 9/07* (2006.01)
*B66F 9/12* (2006.01)
*B66F 9/24* (2006.01)
*B65G 49/06* (2006.01)

(52) U.S. Cl.
CPC .............. *B65G 49/068* (2013.01); *B66F 9/07* (2013.01); *B66F 9/122* (2013.01); *B66F 9/24* (2013.01); *B65G 2203/0283* (2013.01)

(58) Field of Classification Search
USPC ............................................. 414/217; 901/9
See application file for complete search history.

(56) References Cited

U.S. PATENT DOCUMENTS

| | | | |
|---|---|---|---|
| 2010/0272546 A1* | 10/2010 | Wolkerstorfer | B65G 1/0435 414/277 |
| 2010/0290874 A1* | 11/2010 | Wolkerstorfer | B65G 1/0435 414/280 |
| 2011/0158776 A1* | 6/2011 | Inui | H01L 21/67769 414/277 |
| 2012/0010747 A1* | 1/2012 | Okazaki | G05B 19/423 700/253 |
| 2012/0185092 A1* | 7/2012 | Ku | B25J 13/088 700/258 |

OTHER PUBLICATIONS

English language Abstract of CN102020090A (listed above under Foreign Patent Documents); 2 pgs.
PCT International Search Report (Chinese language), for PCT/CN2013/085704; 13 pgs.
English language Abstract of CN103318812A (listed above under Foreign Patent Documents); 1 pg.
PCT International Preliminary Report on Patentability, for PCT/CN2013/085704; 7 pgs.

\* cited by examiner

FORK ASSEMBLY FOR STORAGE/RETRIEVAL MACHINE AND STORAGE/RETRIEVAL MACHINE, METHOD FOR CONVEYING CARTRIDGES

CROSS REFERENCE TO RELATED APPLICATIONS

This application is based on International Application No. PCT/CN2013/085704 filed on Oct. 22, 2013, which claims priority to Chinese National Application No. 201310285853.X filed on Jul. 9, 2013. The entire contents of each and every foregoing application are incorporated herein by reference.

TECHNICAL FIELD

The embodiments of the present invention relate to a fork assembly for storage/retrieval machine and a storage/retrieval machine, and a method for conveying cartridges.

BACKGROUND

In recent years, in the manufacturing industry of liquid crystal displays, with the demand for liquid crystal panels become increasingly greater, the requirement for the convey efficiency of the automated material conveying system in the production process is also continuously promoted. In an automated material conveying system, conveying tools, mainly the storage/retrieval machines, are used to convey the cartridges carrying the display panels. Hence, the convey efficiency of the storage/retrieval machine has direct influence upon the efficiency of the automated conveying system, and also has indirect influence upon the supply volume of the entire liquid crystal industry.

FIG. 1 is a schematic view illustrating the overall structure of a traditional storage/retrieval machine; and FIG. 2 is a structural schematic view of the fork assembly for the traditional storage/retrieval machine. The configuration of the traditional storage/retrieval machine comprises a walking unit 1 on which a main frame 2 is provided, the main frame 2 is provided with a lifting unit 3 therein, a lifting unit 3 is connected with a transfer table 5 and can bring the transfer table 5 to move up and down, and the transfer table 5 is equipped with a fork assembly 4. The fork assembly 4 comprises a rotating table 41 which is arranged on the transfer table 5. The rotating table 41 is provided with two rotary motors 421, and each rotary motor 421 is connected with an extension arm 43 comprising a first arm 431, a second arm 432 and a third arm 433. The two rotary motors 421 are each connected with one first arm 431, and the rotary motor 421 can bring the first arm 431 to rotate horizontally. The outer ends of the two first arms 431 are each hinged with one second arm 432, and the outer ends of the two second arms 432 are hinged horizontally with the same third arm 433. The storage/retrieval machine further comprises a control system (not illustrated in the drawing) which is used for control the integral operation of the storage/retrieval machine.

The extension stroke of the extension arm 43 can be determined in the following manner. Two sensors are provided on the fork assembly 4: one sensor is used for determining the minimum distance point to which the extension arm 43 can extend, called the minimum distance point position sensor 44, and the other sensor is used for determining the maximum distance point to which the extension arm 43 can extend, called the maximum distance point position sensor 45. Both sensors 44, 45 are coupled with the control system. When the extension arm 43 moves to the minimum distance point position, the minimum distance point position sensor 44 may send signal to the control system, and the control system limits the extension arm 43 at the minimum distance point position; when the extension arm 43 moves to the maximum distance point position, the maximum distance point position sensor 45 may send signal to the control system, and the control system limits the extension arm 43 at the maximum distance point position.

However, when the aforesaid traditional storage/retrieval machine is used for conveying cartridges, the extension arm frequently performs protruding or receding actions in the process of taking and placing the cartridges, and for each of the protruding and receding actions, the extension arm will have to pass through the entire stroke between the minimum distance point and the maximum distance point, resulting in a time-consuming telescoping process for the extension arm assembly, which reduces the convey efficiency of the storage/retrieval machine.

SUMMARY

The embodiments of the present invention provide a fork assembly for storage/retrieval machine and a storage/retrieval machine, and a method for conveying cartridges, so as to reduce the time for picking up and placing the cartridges by the storage/retrieval machine, thus improving the efficiency of the storage/retrieval machine to convey cartridges.

One embodiment of the present invention provides a fork assembly for storage/retrieval machine, comprising: a rotating table; an extension arm provided on the rotating table and capable of conducting stretching motion; a driver unit configured for driving the extension arm to conduct the stretching motion; a control system configured for controlling an operation of the driver unit; and a position sensor for the breakpoint which is connected to the control system and configured for determining whether the extension arm performs the stretching motion up to the breakpoint, the breakpoint being located between a maximum distance point and a minimum distance point to which the extension arm extends.

For example, in the fork assembly for storage/retrieval machine, the distance between the breakpoint and the maximum distance point is greater than the depth of the storage rack.

For example, in the fork assembly for storage/retrieval machine, the position sensor for the breakpoint sends signals to the control system when the extension arm extends to the breakpoint.

For example, in the fork assembly for storage/retrieval machine, the extension arm is provided with a sensing piece thereon, the position sensor for the breakpoint is provided on the rotating table, and when the extension arm extends to the breakpoint, the position sensor for the breakpoint is triggered by the sensing piece and then signals to the control system.

Another embodiment of the present invention provides a storage/retrieval machine comprising a walking unit, the walking unit is provided with a main frame thereon and the main frame is provided with a lifting unit therein, the lifting unit is connected with a transfer table and may further bring the transfer table move vertically, the transfer table is equipped with a fork assembly thereon, the fork assembly is a fork assembly for storage/retrieval machine according to any of the above embodiments, and the control system can control the movement of the walking unit and the lifting of the lifting unit.

Still another embodiment of the present invention provides a method for conveying cartridges using the storage/retrieval machine of the above embodiments, comprising: the control system of the storage/retrieval machine receives conveying instruction, controls the storage/retrieval machine to start to move toward the cartridge picking-up storage rack position, and at the same time, makes the extension arm protrude from the minimum distance point position to the breakpoint position, at this time the position sensor for the breakpoint signals to the control system and the control system controls the extension arm to stop action after receiving the signals. After the storage/retrieval machine walks to the cartridge picking-up storage rack position, the storage/retrieval machine stops its movement, and the extension arm continues to protrude from the breakpoint position to the maximum distance point position so as to pick up the cartridges; the extension arm picks up the cartridge and recedes from the maximum distance point position back to the breakpoint position, and at this time, the position sensor for the breakpoint signals to the control system, and the control system controls the extension arm to stop action after receiving the signals; after the storage/retrieval machine walks to the cartridge picking-up storage rack position, the storage/retrieval machine stops its movement, and the extension arm continues to protrude from the breakpoint position to the maximum distance point position so as to pick up the cartridges; the extension arm picks up the cartridge and recedes from the maximum distance point position back to the breakpoint position, and at this time, the position sensor for the breakpoint signals to the control system, and the control system controls the extension arm to stop action after receiving the signals;

For example, the method for conveying the cartridges may further comprise: when the storage/retrieval machine moves toward the cartridge placing storage rack position: a, if the cartridge placing storage rack position and the cartridge picking-up storage rack position are at the same row, the storage/retrieval machine merely performs walking movement, and the extension arm is kept at the breakpoint position; b, if the cartridge placing storage rack position and the cartridge picking-up storage rack position are not at the same row, the storage/retrieval machine walks while the extension arm recedes from the breakpoint position back to the minimum distance point position, then the extension arm rotates to the direction of the cartridge placing storage rack by the rotating table, the extension arm protrudes from the minimum distance point position to the breakpoint position, and at this time, the position sensor for the breakpoint signals to the control system and the control system controls the extension arm to stop action after receiving the signals.

The embodiments of the present invention provide a fork assembly for storage/retrieval machine and a storage/retrieval machine, and a method for conveying cartridges, which may save the time for picking up and placing the cartridges by the extension arm, thus improving the convey efficiency of the storage/retrieval machine.

BRIEF DESCRIPTION OF THE DRAWINGS

In order to illustrate the technical solution of the embodiment of the present invention more clearly, a simply introduction about the drawings of the embodiments will be made in the following, and obviously, the drawings described later relate to only some embodiments of the present invention, rather than limitation to the present invention.

DETAILED DESCRIPTION

A clear and complete description of the technical solution of the embodiment of the present invention will be made in the following in conjunction with the drawings of the embodiment of the present invention, and obviously, the described embodiments are only part of the embodiments of the present invention, rather than all of the embodiments. Based on the embodiments of the present invention, all other embodiments obtained by the ordinary skilled in this art, without any creative endeavors, fall into the protective scope of the present invention.

In the description of this application, it's to be appreciated that the orientation or positional relationship indicated by the terms "center", "upper", "lower", "front", "rear", "left", "right", "vertical", "horizontal", "top", ""bottom", "internal", "external" and the like means the orientation or positional relationship illustrated based on the drawings, and is nothing but for the convenience of describing the present invention and simplifying the description, rather than teaches or suggests that the indicated device or element have to take the specific orientation, be designed and operated in the specific orientation, and hence can not be understood as a limitation to the present invention. Furthermore, the terms "first", "second" are used only for the purpose of description, rather than being appreciated as indicating or suggesting a relative importance or implicitly teaching the number of the indicated technical features. Hence, the features defined by the "first", "second" may clearly indicate or impliedly comprise one or more of the features. In the description of the present invention, "several" means two or more.

It's to be noted that, in the description of the present invention, unless otherwise specified or defined explicitly, the terms "mount", "couple", "connect" and the like should be understood in a broad sense, for example, they may be a detachable connection, or of an integral connection; they may involve a mechanical connection, or an electrical connection, may be a direct connection or an indirect connection through intermediate medium, or may involve the internal communication between two elements. It's possible for the skilled person in this art to appreciate the specific meaning in the present invention of the above terms according to specific circumstances.

Figure 3:
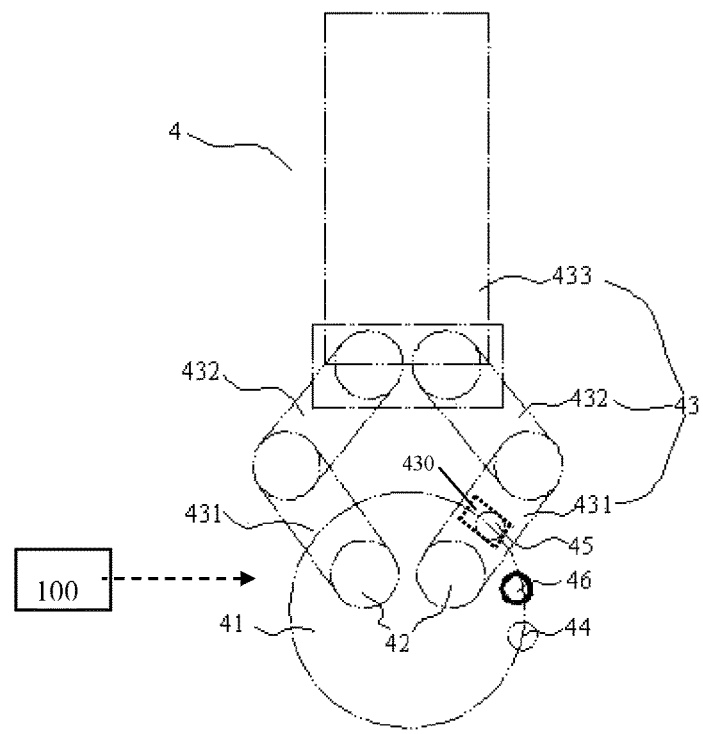
FIG. 3 is a structural schematic view of the fork assembly for storage/retrieval machine of an embodiment of the present invention.

FIG. 3 shows a specific embodiment of the fork assembly for storage/retrieval machine of the embodiment of the present invention. Referring to FIG. 3, the fork assembly for storage/retrieval machine 4 of this embodiment comprises a rotating table 41 which is provided with a driver unit 42 thereon, the driver unit 42 is connected with an extension arm 43 and can drive the extension arm 43 to make a stretching motion. The driver unit 42 is coupled with the control system 100, and the control system 100 is used to control the operation of the driver unit 42. The fork assembly 4 further comprises a position sensor 46 for the breakpoint, which sensor is attached to the control system 100 for detecting whether the extension arm 43 performs the stretching motion up to the breakpoint; the breakpoint is located between the maximum distance point and the minimum distance point to which the extension arm 43 can extend.

The rotating table 41 is arranged on the transfer table. The rotating table 41 is provided with a driver unit 42, this driver unit may comprise two rotary motors, and the two rotary motors are each connected with an extension arm 43. The extension arm 43 comprises a first arm 431, a second arm 432 and a third arm 433. The two rotary motors are each connected with one first arm 431, and may bring the first arm 431 to rotate horizontally. The outer ends of the two first arms 431 are each hinged with one second arm 432 respectively, and the outer ends of the two second arms 432 are hinged horizontally with the same third arm 433. The control system 100 is for example a general computer or a dedicated computer, and is for example coupled with other equipments/devices through signal wires.

In the present embodiment, due to a position sensor for the breakpoint 46 is provided on the fork assembly 4, the position sensor for the breakpoint 46 can send signals to the control system 100 when the extension arm 43 reaches the breakpoint position in the process of stretching motion, and in this way, the control system 100 can control the subsequent action of the extension arm 43 by controlling the driver unit 42. Hence, in the process of taking and placing the cartridges, the extension arm 43 doesn't have to run across the entire stroke when performing its protruding or receding actions, but can select the breakpoint position as the stop point; in this manner, the time consumed by the extension arm 43 for picking up and placing the cartridges is saved, thus improving the convey efficiency of the storage/retrieval machine.

Further, in order to ensure that the cartridge has been completely taken out from the storage racks when the extension arm 43 is at the breakpoint position, the distance between the breakpoint and the maximum distance point may be set to be greater than the depth of the storage racks. The depth of the storage rack means the spacing distance from the front surface of the storage rack to the rear surface. Thus, the walking unit of the storage/retrieval machine is not necessary for taking the cartridges out from the storage rack, so that the conveyance is more convenient and quickly.

For example, the breakpoint position may be determined as follows. The position sensor 46 for the breakpoint can send signal to the control system 100 when the extension arm 43 extends to the breakpoint position. Hence, the control system 100 can duly control the next action of the extension arm 43.

In order to enable the position sensor 46 for the breakpoint to duly send signals, it's possible to arrange a sensing piece 430 (as illustrated by the rectangular frame in the drawing) on the extension arm 43, and the position sensor 46 for the breakpoint is provided on the rotating table 41. The position sensor 46 for the breakpoint can be triggered by the sensing piece when the extension arm 43 extends to the breakpoint position. When being triggered, the position sensor 46 for the breakpoint can signal to the control system.

Figure 1:
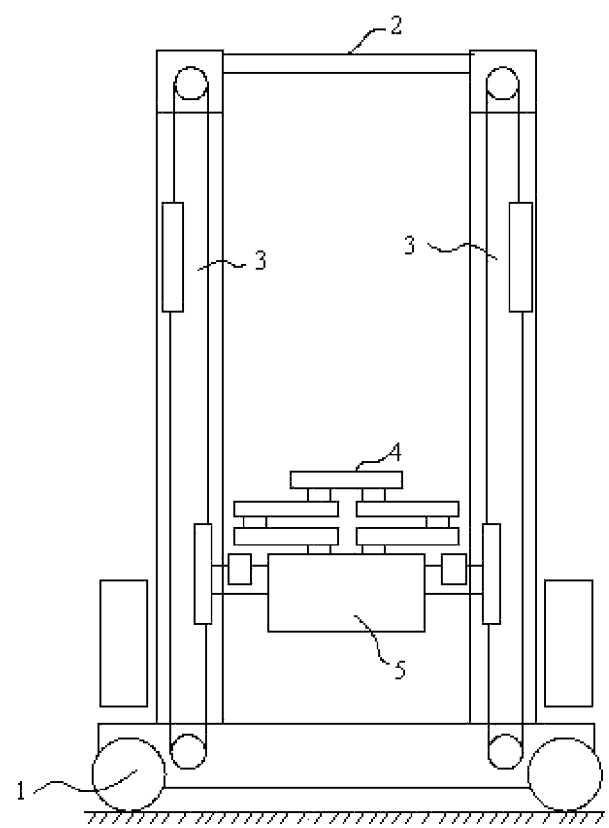
FIG. 1 is a schematic view illustrating the overall structure of a traditional storage/retrieval machine.
Figure 2:
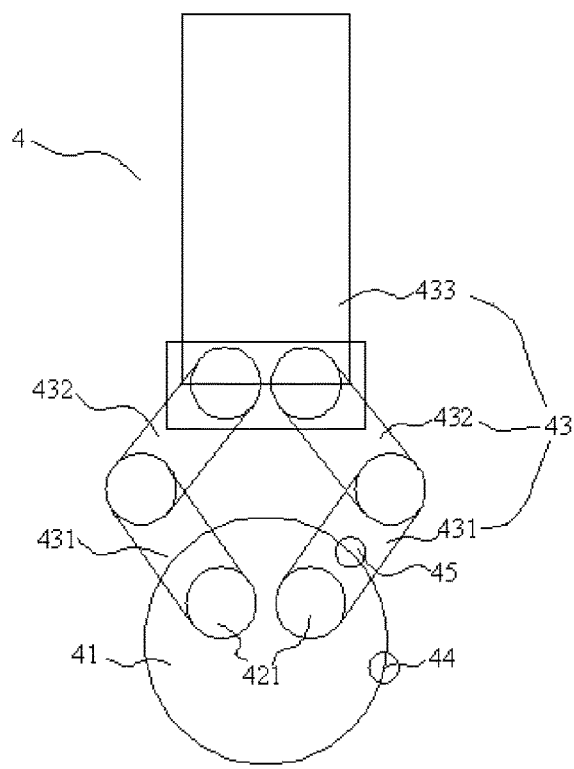
FIG. 2 is a structural schematic view for the fork assembly for the above traditional storage/retrieval machine.

As illustrated in FIG. 3, when the rest configurations of the extension arm 43 are identical to the assembly configurations of the extension arm 43 of the traditional storage/retrieval machine as illustrated in FIG. 1, the sensing piece 430 may be provided on the first arm 431, and the position sensor 46 for the breakpoint may be provided on the rotating table 41 and between the minimum distance point position sensor 44 and the maximum distance point position sensor 45. The minimum distance point position sensor 44, the position sensor 46 for the breakpoint, and the maximum distance point position sensor 45 are located on the same circumference obtained by taking the rotation axis of the first arm 431 as the centre, such that when the first arm 431 rotates to different positions, the sensing piece 430 can trigger all the position sensors respectively. These position sensors are positioned as illustrated by the circle in FIG. 3 and can send signal to the control system 100 when being triggered. Hence, one sensing piece is enough for realizing the triggering of the three position sensors, thus saving the cost and simplifying the assembly process.

Of course, the embodiments of the present invention is not limited to thereto; in other examples of the embodiment of the present invention, the extension arm 43 may also be of a linear telescopic configuration, for example, an air cylinder or a hydraulic cylinder is adapted to bring the piston rod into a linear stretching motion, and the piston rod may be connected with commodity trays thereon. At this time, the minimum distance point position sensor 44, the maximum distance point position sensor 45 as well as the position sensor 46 for the breakpoint may each be arranged in the length direction of the piston rod, the sensing piece may be provided on the piston rod, and such a configuration presents low cost and convenience for controlling the telescoping distance.

An embodiment of the present invention also provide a storage/retrieval machine comprising a walking unit, the walking unit is provided with a main frame thereon, a lifting unit is located in the main frame, and the lifting unit is connected with a transfer table and may bring the transfer table to move up and down, the transfer table is equipped with a fork assembly thereon, and the control system may control the movement of the walking unit and the lifting of the lifting unit. The fork assembly is a fork assembly 4 for storage/retrieval machine according to any of the above embodiments.

Because the fork assembly used in the storage/retrieval machine of the present embodiment is identical to the fork assembly 4 provided in each of the above embodiments of the fork assemblies, both of them can solve the same technical problems and reach the same intended effect.

Figure 4:
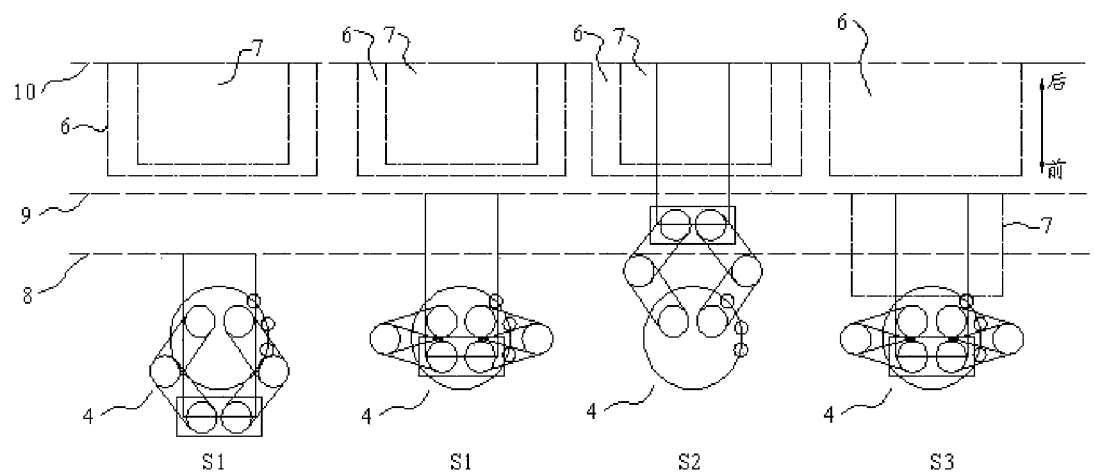
FIG. 4 is a schematic view illustrating the action process for the storage/retrieval machine of the embodiment of the present invention to pick up a cartridge.
Figure 5:
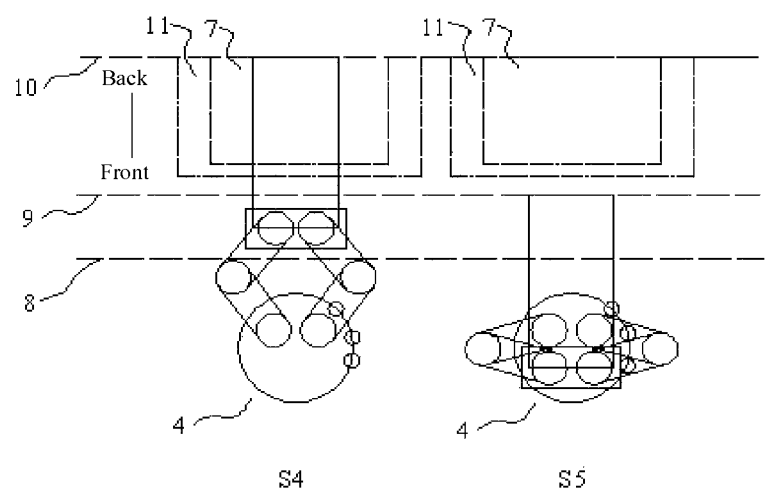
FIG. 5 is a schematic view illustrating the action process for the storage/retrieval machine of the embodiment of the present invention to place a cartridge.

FIG. 4 is a schematic view illustrating the action process for the storage/retrieval machine of an embodiment of the present invention to pick up a cartridge; and FIG. 5 is a schematic view illustrating the action process for the storage/retrieval machine of the embodiment of the present invention to place a cartridge. Referring to FIGS. 4 and 5, the embodiment of the present invention also provide a method for conveying cartridges using the storage/retrieval machine of the above embodiments, which may be carried out as follows.

S1, the control system of the storage/retrieval machine receives conveying instruction, controls the storage/retrieval machine to start to move toward the position of the cartridge picking-up storage rack 6, and at the same time, makes the extension arm 43 protrude from the minimum distance point position 8 to the breakpoint position 9, at this time the position sensor 46 for the breakpoint signals to the control system, and after receiving the signals the control system controls the extension arm to stop the action by controlling the driver unit;

S2, after the storage/retrieval machine moves to the position of the cartridge picking-up storage rack 6, the storage/retrieval machine stops its movement, and the extension arm 43 continues to protrude from the breakpoint position 9 to the maximum distance point position 10 so as to pick up the cartridges 7;

S3, the extension arm 43 pick up the cartridge 7 and recedes from the maximum distance point position 10 back to the breakpoint position 9, and at this time, the position sensor 46 for the breakpoint sends signals to the control system, and after receiving the signals the control system controls the extension arm 43 to stop the action by controlling the driver unit;

S4, after the storage/retrieval machine moves to the position of the cartridge picking-up storage rack 11, the storage/retrieval machine stops its movement, and the extension arm 43 continues to protrude from the breakpoint position 9 to the maximum distance point position 10 so as to pick up the cartridge 10;

S5, the extension arm 43 puts down the cartridge 7 and recedes from the maximum distance point position 10 back to the breakpoint position 9, and at this time, the position sensor 46 for the breakpoint sends signals to the control system, and after receiving the signals the control system controls the extension arm 43 to stop action by controlling the driver unit;

From the above steps, the protruding or receding actions made by the fork assembly 4 when picking up and placing the cartridge 7 does not move across the entire stroke, but only acts between the breakpoint position 9 and the maximum distance point position 10, thus reducing the distance for picking up and placing the cartridge 7 by the fork assembly 4 of the storage/retrieval machine, saving the time consumed by the fork assembly 7 to take and place the cartridge 7, and improving the convey efficiency of the storage/retrieval machine.

Further, in order to meet the arrangement of different cartridge placing storage racks 11, when the storage/retrieval machine is moving toward the position of the cartridge placing storage rack 11, different process may be conducted according to the following different situations:

A, if the position of the cartridge placing storage rack 11 and the position of the cartridge picking-up storage rack 6 are at the same row, the storage/retrieval machine merely performs walking movement, and the extension arm 43 is kept at the breakpoint position 9;

B, if the position of the cartridge placing storage rack 11 and the position of the cartridge picking-up storage rack 6 are not at the same row, the storage/retrieval machine walks while the extension arm 43 recedes from the breakpoint position 9 back to the minimum distance point position 8, then the extension arm 43 rotates to the direction of the cartridge placing storage rack 11 by the rotating table 41, the extension arm 43 protrudes from the minimum distance point position 8 to the breakpoint position 9, and at this time, the position sensor 46 for the breakpoint sends signals to the control system and after receiving the signals the control system controls the extension arm 43 to stop the action.

Hence, the above processes can meet arrangement situations of different storage racks, so that the storage/retrieval machine of the embodiment of the present invention has a much broader applicability.

The above are only the exemplary embodiments of the present invention, rather than limiting the protective scope of the present invention which is determined by the attached claims.

The invention claimed is:

1. A fork assembly for storage/retrieval machine, comprising:
    a rotating table;
    an extension arm provided on the rotating table and capable of conducting a stretching motion;
    a driver unit configured for driving the extension arm to conduct the stretching motion;
    a control system configured for controlling an operation of the driver unit;
    a position sensor for a breakpoint which is connected to the control system and configured to determine whether the extension arm performs the stretching motion up to the breakpoint,
    wherein the extension arm comprises a first arm, a second arm and a third arm, an outer end of the first arm is hinged with the second arm, and an outer end of the second arm is hinged with the third arm,
    the driver unit is directly connected with the first arm and configured for bringing the first arm to rotate horizontally to drive the extension arm to conduct the stretching motion, the position sensor is disposed at the breakpoint, the breakpoint is located on a motion trail of the first arm, and between a position where the first arm is located upon the extension arm extending to a maximum distance and a position where the first arm is located upon the extension arm extending a minimum distance.

2. The fork assembly for storage/retrieval machine according to claim 1, wherein a distance between the breakpoint and the maximum distance point is greater than a depth of a storage rack.

3. The fork assembly for storage/retrieval machine according to claim 2, wherein the position sensor for the breakpoint is configured to send signals to the control system when the extension arm extends to the breakpoint.

4. The fork assembly for storage/retrieval machine according to claim 3, wherein the extension arm is provided with a sensing piece thereon, the position sensor for the breakpoint is provided on the rotating table, and when the extension arm extends to the breakpoint, the position sensor for the breakpoint is triggered by the sensing piece and then sends signals to the control system.

5. The fork assembly for storage/retrieval machine according to claim 3, wherein the control system is configured to stop the drive unit upon the position sensor sending signals to the control system.

6. The fork assembly for storage/retrieval machine according to claim 1, wherein the position sensor for the breakpoint is configured to send signals to the control system when the extension arm extends to the breakpoint.

7. The fork assembly for storage/retrieval machine according to claim 6, wherein the extension arm is provided with a sensing piece thereon, the position sensor for the breakpoint is provided on the rotating table, and when the extension arm extends to the breakpoint, the position sensor for the breakpoint is triggered by the sensing piece and then sends signals to the control system.

8. The fork assembly for storage/retrieval machine according to claim 1, wherein the driving unit comprises a rotary motor, the rotary motor is directly connected with the first arm.

9. A storage/retrieval machine comprising a walking unit, wherein the walking unit is provided with a main frame thereon and the main frame is provided with a lifting unit therein, the lifting unit is connected with a transfer table and capable of driving the transfer table to move up and down, the transfer table is equipped with a fork assembly thereon, the fork assembly comprises:

a rotating table;

an extension arm provided on the rotating table and capable of conducting stretching motion;

a driver unit configured for driving the extension arm to conduct the stretching motion;

a control system configured for controlling an operation of the driver unit;

a position sensor for a breakpoint which is connected to the control system and configured for determining whether the extension arm performs the stretching motion up to the breakpoint, wherein the extension arm comprises a first arm, a second arm and a third arm, an outer end of the first arm is hinged with the second arm, and an outer end of the second arm is hinged with the third arm, the driver unit is directly connected with the first arm and configured for bringing the first arm to rotate horizontally to drive the extension arm to conduct the stretching motion, the position sensor is disposed at the breakpoint, the breakpoint is located on a motion trail of the first arm, and between a position where the first arm is located upon the extension arm extending to a maximum distance and a position where the first arm is located upon the extension arm extending a minimum distance.

10. A method for conveying cartridges using the storage/retrieval machine according to claim 9, comprising:

the control system of the storage/retrieval machine receives conveying instruction, controls the storage/retrieval machine to start to move toward the cartridge picking-up storage rack position, and at the same time, makes the extension arm protrude from the minimum distance point position to the breakpoint position, at this time the position sensor for the breakpoint sends signals to the control system and after receiving the signals the control system controls the extension arm to stop action;

after the storage/retrieval machine walks to the cartridge picking-up storage rack position, the storage/retrieval machine stops its movement, and the extension arm continues to protrude from the breakpoint position to the maximum distance point position so as to pick up the cartridges;

the extension arm picks up the cartridge and recedes from the maximum distance point position back to the breakpoint position, and at this time, the position sensor for the breakpoint sends signals to the control system, and after receiving the signals the control system controls the extension arm to stop action;

the storage/retrieval machine moves to the cartridge placing storage rack position, the storage/retrieval machine stops its movement, and the extension arm continues to protrude from the breakpoint position to the maximum distance point position;

the extension arm puts down the cartridge and recedes from the maximum distance point position back to the breakpoint position, and at this time, the position sensor for the breakpoint send signals to the control system, and after receiving the signals the control system controls the extension arm to stop action.

11. The method for conveying cartridges according to claim 10, further comprising:

when the storage/retrieval machine moves toward the cartridge placing storage rack position, whereas if the cartridge placing storage rack position and the cartridge picking-up storage rack position are at a same row, the storage/retrieval machine merely performs walking movement, and the extension arm is kept at the breakpoint position; or whereas if the cartridge placing storage rack position and the cartridge picking-up storage rack position are not at a same row, the storage/retrieval machine moves while the extension arm recedes from the breakpoint position back to the minimum distance point position, then the extension arm rotates to a direction of the cartridge placing storage rack, the extension arm protrudes from the minimum distance point position to the breakpoint position, and at this time, the position sensor for the breakpoint sends signals to the control system and after receiving the signals the control system controls the extension arm to stop action.

* * * * *